(12) United States Patent
Pereira Mosqueira et al.

(10) Patent No.: US 9,381,992 B2
(45) Date of Patent: Jul. 5, 2016

(54) LEADING EDGE FOR AN AIRCRAFT LIFTING SURFACE

(71) Applicant: Airbus Operations S.L., Getafe (ES)

(72) Inventors: Fernando Pereira Mosqueira, Getafe (ES); Enrique Guinaldo Fernandez, Getafe (ES); Carlos Garcia Nieto, Getafe (ES); Francisco Javier Honorato Ruiz, Getafe (ES); Andrea Ivan Marasco, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 0 days.

(21) Appl. No.: 14/579,717

(22) Filed: Dec. 22, 2014

(65) Prior Publication Data

US 2015/0175253 A1 Jun. 25, 2015

(30) Foreign Application Priority Data

Dec. 23, 2013 (EP) ................................ 13382543

(51) Int. Cl.
*B64C 3/18* (2006.01)
*B64C 3/28* (2006.01)
*B64C 3/26* (2006.01)

(52) U.S. Cl.
CPC . *B64C 3/185* (2013.01); *B64C 3/26* (2013.01); *B64C 3/28* (2013.01)

(58) Field of Classification Search
CPC .............. B64C 3/185; B64C 3/26; B64C 3/28
See application file for complete search history.

(56) References Cited

U.S. PATENT DOCUMENTS 1,749,293 A * 3/1930 Marston .................. B64C 3/187
244/123.4
1,781,160 A * 11/1930 Carns ......................... B64C 3/00
244/123.14

(Continued)

FOREIGN PATENT DOCUMENTS

EP 2196391 A2 6/2010
FR 2918036 A1 1/2009

(Continued)

OTHER PUBLICATIONS

Extended European Search Report for EP Patent Application No. 13382543.0, mailed Jul. 28, 2014.

*Primary Examiner* — Valentina Xavier
(74) *Attorney, Agent, or Firm* — Greer, Burns & Crain, Ltd.

(57) ABSTRACT

An optimized leading edge for an aircraft lifting or supporting surfaces, such as wings and stabilizers, wherein the leading edge includes inboard and outboard leading edge sections that are span-wise arranged so as to form together an aerodynamic surface of the leading edge. Each of the leading edge sections includes a skin panel and a support structure formed by spars that are internally arranged in the skin panel. These two support structures are designed taking into account the different load requirements of those two different sections, so that the number of spars in each leading edge section is progressively reduced from root to tip of the leading edge, in such a way that the support structure of the outboard leading edge section, has less spars than the inboard leading edge section. Hence the weight of the leading edge is reduced while still maintaining the required structural behavior.

18 Claims, 7 Drawing Sheets

(56) References Cited

U.S. PATENT DOCUMENTS

| | | | |
|---|---|---|---|
| 6,237,873 B1 * | 5/2001 | Amaoka | B64C 3/00 244/123.7 |
| 6,616,101 B2 * | 9/2003 | De Castro Nodal | B64C 3/28 244/123.3 |
| 7,731,128 B2 * | 6/2010 | Overbergh | B64C 9/24 244/121 |
| 2011/0049298 A1 | 3/2011 | Makela | |
| 2013/0082142 A1 | 4/2013 | Li et al. | |

FOREIGN PATENT DOCUMENTS

| | | |
|---|---|---|
| FR | 2975929 A1 | 12/2012 |
| GB | 724758 A | 2/1955 |

* cited by examiner

LEADING EDGE FOR AN AIRCRAFT LIFTING SURFACE

CROSS-REFERENCES TO RELATED APPLICATION

This application claims the benefit of European Patent Application No. 13382543.0 filed on Dec. 23, 2013, the entire contents of which are hereby incorporated herein by reference.

BACKGROUND OF THE INVENTION

The present invention refers in general to a leading edge for aircraft lifting or supporting surfaces, such as wings and stabilizers. One object of the present invention is to provide an optimized structure for a leading edge of an aircraft, in order to reduce its weight and to thereby reduce fuel consumption.

Additionally, it is also an object of the present invention to provide a leading edge of an aircraft which can be manufactured with a reduced number of components, in order to simplify its assembly and manufacturing process.

Aircraft lifting surfaces such as wings, Horizontal Tail Planes (HTP), Vertical Tail Planes (VTP), etc., are formed by skin panels reinforced internally by a supporting structure, which typically comprises longitudinal front and rear spars, transverse ribs joining the spars, and stringers between the ribs and skin panels.

On the leading edge of a wing, that is, on the front edge of the wing as seen in the direction of flight, there are one or more leading edge sections longitudinally arranged to form the outermost surface of the wing. The leading edge is coupled with the torsion box of the wing and comprises its own skin panel and support structure.

Known leading edge designs comprise skin panels internally stiffened by several leading edge ribs. In the case of large commercial aircraft, two additional metallic spars are used, wherein one of them is vertically arranged next to the foremost point or nose of the leading edge, and the other one is diagonally arranged in a cross-sectional view of the leading edge.

Conventionally, the skin panels of leading edges have a C-shaped configuration in a cross-sectional view, and are constructed as non-monolithic structures which consist of a sandwiched structure formed by a honeycomb core with Carbon Fiber Reinforced Plastic (CFRP) or Glass Fiber Reinforced Plastic (GFRP) facesheets, or by a honeycomb core covered by a metallic protection sheet made of steel or aluminium alloys to protect the leading edge from erosion phenomena. U.S. Pat. No. 6,616,101B2 is an example of a leading edge having sandwich skin panels of the above-mentioned type.

It is known that honeycomb sandwiched panels are difficult to repair and suffer from water ingestion during flight.

Additional elements such as leading edge extensions are used in transition areas between the leading edge and the fuselage. These elements are usually constructed with the same sandwich philosophy used for skin panels.

Due to the large span of most leading edges, these are split in several sections which are constructed as sub-assemblies to ease their manufacture, assembly and maintenance. Although the profile of the leading edge varies progressively from root to tip, the internal supporting structure is basically the same in all the sections of the leading edge.

There is therefore the need for leading edge structures which are lighter and which can be constructed with a reduced number of components in order to simplify their manufacture.

SUMMARY OF THE INVENTION

The present invention is based on an optimized architecture of an existing leading edge, taking into account the deformation induced by the torsion box on the leading edge structure as well as the pressure distribution acting on it with the aim of reducing its weight and simplifying its manufacturing method.

The invention relates to a leading edge of an aircraft wing or stabilizer, which comprises a skin panel which has an essentially C-shaped cross-section or some other similar shape with a closed front edge and open tail edge, as seen in the flight direction. The leading edge further comprises a support structure arranged on the inner surface side of the skin panel.

Therefore, an aspect of the invention refers to a leading edge for an aircraft lifting surface, such as a wing or a stabilizer, which typically comprises several sub-assemblies or leading edge sections, arranged span-wise one after the other to form together the aerodynamic surface of the leading edge. For example, the leading edge may be formed by an inboard leading edge section and an outboard leading edge section, both of them comprising a skin panel having a substantially C-shaped cross-sectional configuration, and in such a manner that the profile of the leading edge varies progressively from root to tip.

The inboard and outboard leading edge sections are provided internally with a support structure to reinforce the respective skin panel, wherein said support structures comprise a number of spars longitudinally arranged in the leading edge.

The leading edge architecture is formed by at least two different support structure configurations, one for the inboard leading edge section (closer to the leading edge root), and another for the outboard leading edge section (closer to the leading edge tip), in such a manner that the spars of each support structure are located in correspondence with the main torsion and bending load paths created in the leading edge, thus, the number of elements of both support structures and their arrangement is different.

These two support structures are designed taking into account the different geometry and load requirements of those two different sections, wherein the inboard section has a wider cross-section than the outboard section, so that the structural behavior at the outboard section is different than the structural behavior at the inboard section.

More precisely, the number of spars in each leading edge section is progressively reduced from root to tip of the leading edge. Therefore, the support structure of the outboard leading edge section, has less spars than the inboard leading edge section.

A technical effect obtained from the above-described progressive reduction of the number of spars is that a significant weight saving is achieved due to the fact that the spars of each support structure are located in correspondence with the main load paths created in the leading edge. In this manner, the same or an even better structural behavior of the leading edge is achieved, but with a reduced number of components (spars) compared with prior art designs.

Since a leading edge according to the invention can now be manufactured with a reduced number of components, the manufacturing method thereof can also be simplified.

The leading edge according to the invention can now be manufactured using only monolithic panels, such as CFRP laminates and the associated manufacturing methods, avoiding therefore the use of sandwiched panels with honeycomb core. Since those honeycomb panels are not used, the aforementioned water ingestion problems are eliminated, and repair tasks are greatly simplified.

BRIEF DESCRIPTION OF THE DRAWINGS

Preferred embodiments of the invention are henceforth described with reference to the accompanying drawings, in which:

FIGS. 1(a)-1(c) show a schematic representation of a perspective view of a leading edge according to the invention, wherein

FIGS. 3(a)-3(f) show a schematic representation of a cross-sectional view of a leading edge formed by inboard, intermediate and outboard sections operatively assembled together wherein FIG. 3(b) is a cross-section al view of the inboard section, FIG. 3(c) is a cross-section al view of the intermediate section, FIG. 3(d) is a cross-section al view of the outboard section.

DETAILED DESCRIPTION OF THE PREFERRED EMBODIMENTS

Figure 1A:
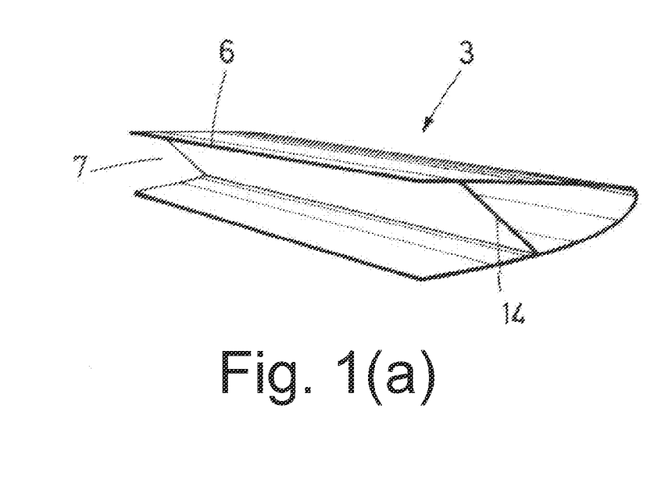
FIG. 1(a) shows an outboard section.
Figure 1B:
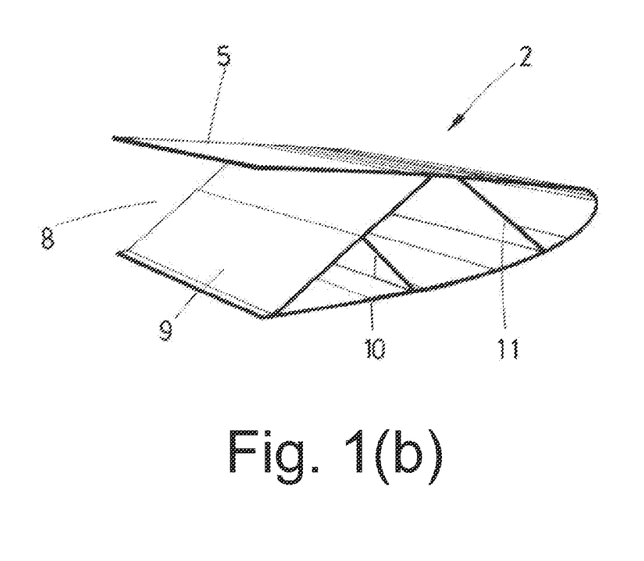
FIG. 1(b) shows an inboard section.
Figure 1C:
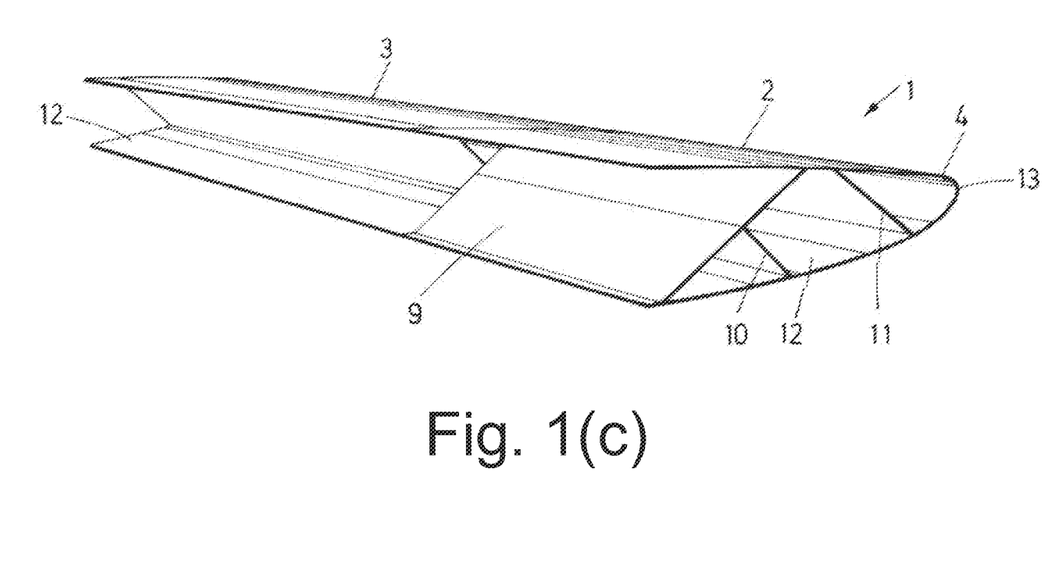
FIG. 1(c) shows a complete leading edge formed by the assembly of these two sections.

FIGS. 1(a)-1(c) show an exemplary embodiment of a leading edge (1) for an aircraft lifting surface which comprises an inboard leading edge section (2) and an outboard leading edge section (3), which in an operative state are longitudinally arranged as shown in FIG. 1(c) to form together the aerodynamic surface (4) of the leading edge (1).

The inboard and outboard leading edge sections (2,3) respectively comprise inboard and outboard C-shaped skin panels (5,6), and inboard and outboard support structures (8,7) fixed to the inner surface of the respective skin panels (5,6). The support structures (7,8) comprise a number of longitudinal spars diagonally arranged along the leading edge, that is, each spar of the outboard and inboard leading edge sections is laying on an oblique plane with respect to the chord plane of the aerodynamic surface (4) of the leading edge (1), as shown in FIG. 2.

The support structure (8) of the inboard leading edge section (2) comprises three spars: a main spar (9), a front spar (11) and an intermediate spar (10), wherein the front and intermediate spars (11,10) are shorter than the main spar (9). These three spars are diagonally arranged (in a cross-sectional view), in such a manner that the front and intermediate spars (11,10) are inclined in an opposite direction to the inclination of the main spar (9).

Figure 2:
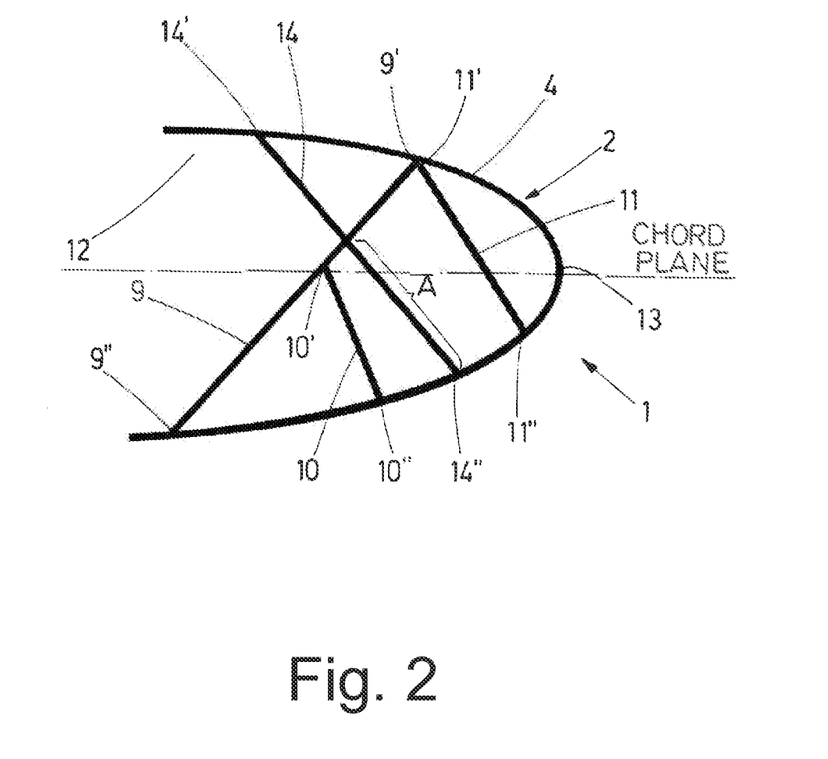
FIG. 2 shows a schematic representation of a cross-sectional view of a leading edge formed by outboard and inboard sections operatively assembled together.

The main spar (9) has first and second edges (9',9") respectively joined to upper and lower parts of an inner surface (12) of the inboard skin panel (5), as shown in FIG. 2, and in such a manner that the first edge (9') is closer to the foremost point (13) of the leading edge, than the second edge (9"). In turn, the intermediate spar (10) has a first edge (10') joined at an intermediate point of the main spar (9), and a second edge (10") joined with a lower part of the inner surface (12) of skin panel (5), whereas the front spar (11) has a first end (11') joined with the first edge (9') of the main spar (9), and a second end (11") joined with a lower part of the skin panel (5), closer to the foremost point (13) than the second edge (10").

In an alternative embodiment, the first end (11') of the front spar (11) is joined with an upper part of the skin panel at a point closer to the foremost point (13) of the leading edge, than the first edge (9') of the main spar (9).

The configuration of the support structure (7) of the outboard leading edge section (3) is different from the previously described support structure (8), with regard to the number of spars and the arrangement of these spars. In the preferred embodiment of FIG. 2, the outboard leading edge section (3) comprises only one spar (14) diagonally arranged with opposite inclination than the main spar (9).

Additionally, the position of that single spar (14) is different from the position of any spar of the inboard section. More specifically in the view of FIG. 2, the single spar (14) of the outboard leading edge section is positioned in such a way that in a cross-sectional view of the leading edge, a part (A) of the spar (14) is located between the front an read spars (11,10) of the inboard leading edge section (2). A first edge (14') of the single spar (14) is fixed to an upper part of the skin panel (6), and a second edge (14") of the spar (14) is fixed at a point of a lower part of the skin panel (6), which is located between the second edges (11',10') of the front and read spars (11,10).

FIGS. 3(a)-3(f) show another preferred embodiment of the invention corresponding to a leading edge for a larger aircraft, in which a third section is added at the inboard part of the leading edge of FIG. 1, this third section having more spars than the other two sections. The leading edge section (1) of FIGS. 3(a)-3(f) comprises an inboard section (2), and an outboard section (3) and an intermediate section (18) assembled in between inboard and outboard sections (2,3). Therefore the support structure (8) of the inboard leading edge section (2) in this case comprises four spars: a rear spar (15), main spar (9), front and intermediate spars (10, 11). This rear, intermediate and front spars (15,10,11) are also shorter than the main spar (9), and are also diagonally arranged with an opposite inclination to the inclination of the main spar (9).

Figure 3A:
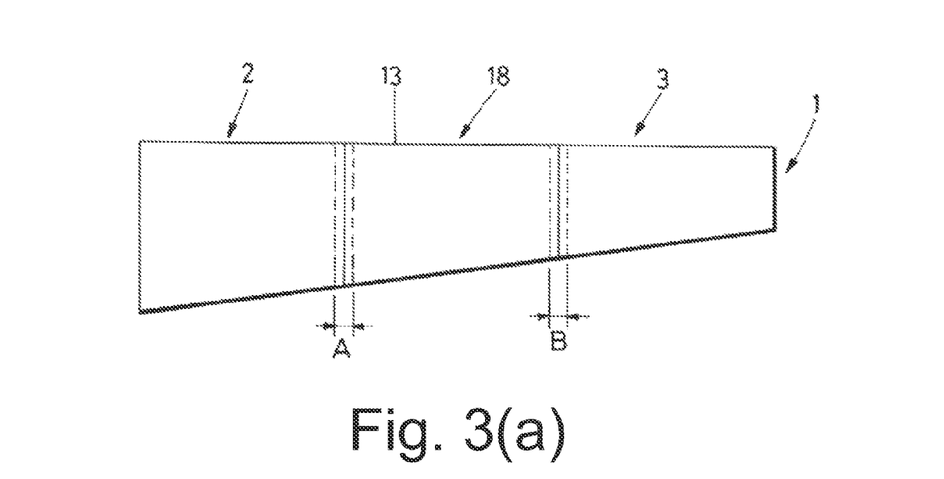
FIG. 3(a) is a top plan view.
Figure 3B:
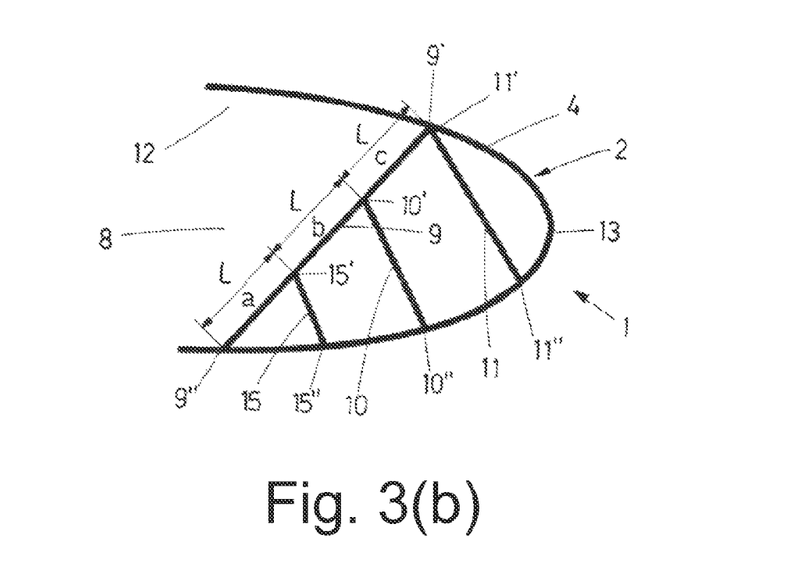

The rear spar (15) has a first edge (15') fixed to a point of the main spar (9) and a second edge (15") fixed to a point of the lower part of the corresponding skin panel (5). In this embodiment, the spars (11,10,15) are arranged so that the main spar (9) (a transverse section thereof as shown in FIG. 3a)) is divided in three segments (a,b,c) of the same length (L), that is, the distance between edges (11') and (10'), between (10') and (15'), and between (15') and (9") is substantially the same.

Figure 3C:
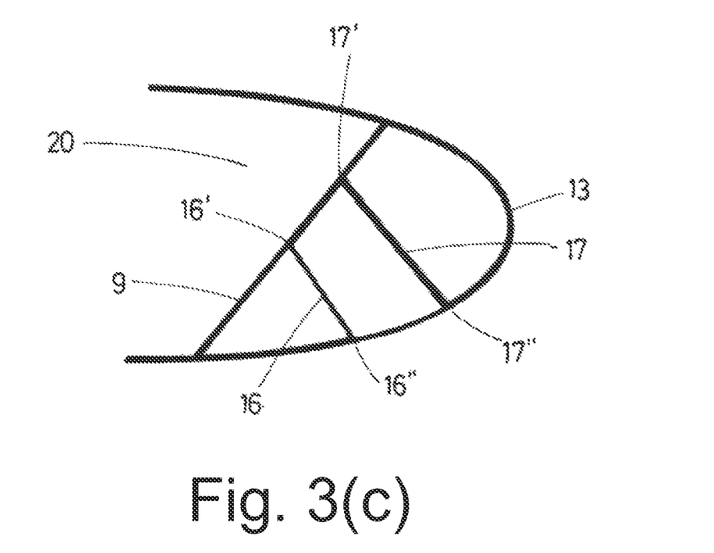
Figure 3D:
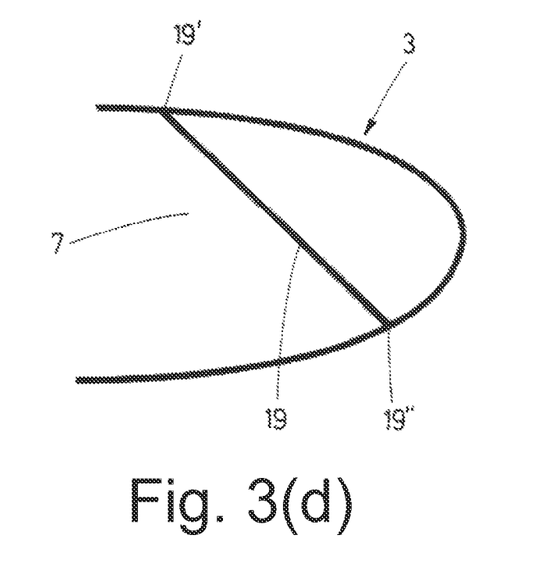
Figure 3E:
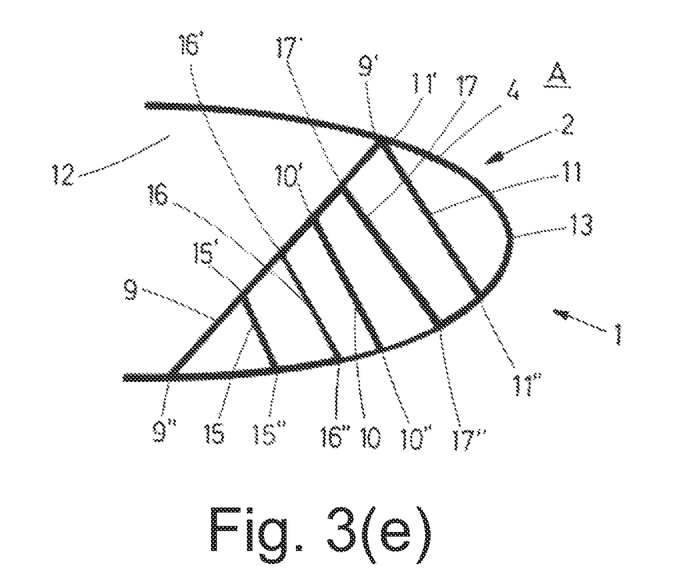
FIG. 3(e) is a cross-sectional view of the interface "'A" between inboard and intermediate sections.
Figure 3F:
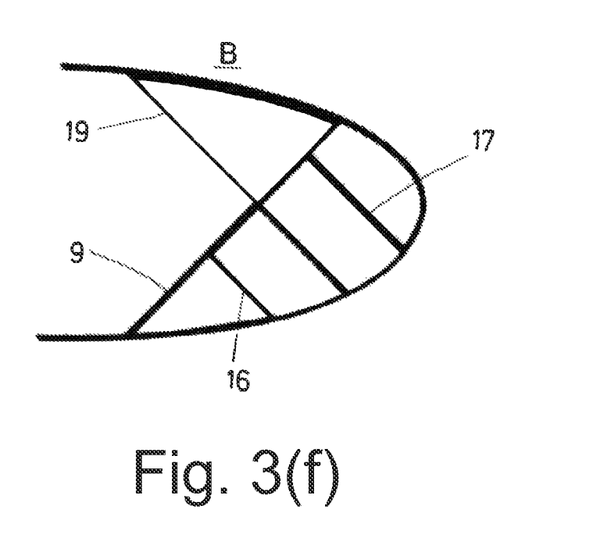
FIG. 3(f) is a cross-sectional view of the interface "'B" between intermediate and outboard sections.

In this embodiment the support structure (20) of the intermediate section (18) includes two diagonal spars (16,17) as shown in FIG. 3(c), both with the same inclined/oriented in the same direction (opposite to the inclination of the main spar) but at different angles. More specifically, the support structure (20) includes a first spar (17) and a second spar (16), wherein the first spar (17) is closer to the foremost point (13) of the leading edge (1) than the second spar (16). The first spar and the second spars (17,16) are joined with the main spar (9) respectively at upper edges (17', 16') and with a lower part of the skin panel respectively at lower edges (17", 16").

The support structure (7) of the outboard section (3) in the embodiment of FIGS. 3(a)-3(f), only includes one spar (19) obliquely arranged with an opposite inclination to that of the main spar (9). This spar (19) is joined to the skin panel respectively at its upper and lower edges (19',19"), and is arranged such that a part of it is located (in a cross-sectional view) between the first and second spars (17,16) as shown in FIG. 3(*f*).

Similarly to the embodiment of FIGS. 3(*a*)-3(*f*), the position of the first and second spars (17,16) is selected in such a way that a part of each of said spars is located between two of the spars of the inboard support structure (8). As shown in FIG. 3(*e*), a part of the first spar (17) is located (in a cross-sectional view) between front and intermediate spars (11,10), and a part of the second spar (16) is located (in a cross-sectional view) between intermediate and rear spars (10,15).

The leading edge (1) structure is formed entirely by spars which are advantageously arranged following the position of the main load paths which appear at the leading edge, that is, no ribs are needed to internally reinforce the nose of the leading edge. Therefore, it can be appreciated that the number of spars is progressively reduced from the inboard section to the outboard section, so that the support structure of the outboard section has less spars than the inboard section.

Due to the optimization of the leading edge structure, the skin panel and the support structure of both leading edge sections can be constructed now as monolithic structures, for example they consist of spars only are constructed entirely of composite material.

As is apparent from the foregoing specification, the invention is susceptible of being embodied with various alterations and modifications which may differ particularly from those that have been described in the preceding specification and description. It should be understood that Applicant(s) wish to embody within the scope of the patent warranted hereon all such modifications as reasonably and properly come within the scope of the contribution to the art.

The invention claimed is:

1. A leading edge for an aircraft lifting surface, comprising:
   an inboard leading edge section and an outboard leading edge section arranged span-wise so as to form together the aerodynamic surface of the leading edge, and
   each of said outboard and inboard leading edge sections comprising a skin panel comprising a substantially C-shaped cross-sectional configuration and a support structure internally joined to the skin panel,
   wherein said support structure comprises a number of spars longitudinally arranged along the leading edge,
   wherein the support structure of the outboard leading edge section has less spars than the inboard leading edge section,
   wherein the support structure of the inboard leading edge section comprises:
   a main spar, a front spar and an intermediate spar,
   wherein the front and intermediate spars are shorter than the main spar, and
   wherein the main, front and intermediate spars are obliquely arranged, in such a manner that the front and intermediate spars are inclined in an opposite direction to the inclination of the main spar.

2. The leading edge according to claim 1 wherein the spar of the outboard leading edge section is positioned so that in a cross-sectional view of the leading edge, a part of that spar is located between two spars of the inboard leading edge section.

3. The leading edge according to claim 1, wherein the support structure of the outboard leading edge section comprises only one spar diagonally arranged with the same inclination direction as the front and intermediate spars.

4. The leading edge according to claim 1 wherein the main spar has first and second edges joined with an inner surface of the skin panel, wherein the main spar is arranged so that a first edge is joined with an upper part of the skin panel, wherein the first edge is closer to the foremost point of the leading edge than the second edge, and wherein the intermediate spar has a first edge joined at an intermediate point of the main spar, and a second edge joined with a lower part of the skin panel.

5. The leading edge according to claim 4 wherein the front spar has a first end joined with the first edge of the main spar, and a second end joined with a lower part of the skin panel.

6. The leading edge according to claim 4 wherein the front spar has a first end joined with an upper part of the skin panel at a point closer to the foremost point of the leading edge than the first edge of the main spar.

7. The leading edge according to claim 1, wherein the support structure of the inboard leading edge section further comprises a rear spar diagonally arranged with the same inclination as front and intermediate spars, and wherein the distance between the edges of the front, intermediate and rear spars joined with the main spar, is substantially the same.

8. The leading edge according to claim 7 wherein the support structure of the outboard leading edge section, comprises two spars, and wherein a part of each of said spars is located between two of the spars of the inboard support structure.

9. The leading edge according to claim 1 further comprising an intermediate section assembled in between the inboard and outboard sections, and wherein the support structure of the outboard leading edge section has less spars than the support structure of the intermediate section, and wherein the support structure of the intermediate section has less spars than the support structure of the inboard leading edge section.

10. The leading edge according to claim 9 wherein the support structure of the outboard leading edge section has only one spar which is positioned so that in a cross-sectional view of the leading edge, a part of that spar is located between two spars of the intermediate leading edge section, and wherein at least one spar of the intermediate leading edge section is positioned such as a part of it is located between two spars of the inboard leading edge section.

11. The leading edge according to claim 1, wherein the skin panel and the support structure of the edge sections, are constructed as monolithic structures, and they are made of a composite material.

12. The leading edge according to claim 1, wherein the support structure of each section consists of at least one spar.

13. The leading edge according to claim 2, wherein the support structure of the outboard leading edge section comprises only one spar diagonally arranged with the same inclination direction as the front and intermediate spars.

14. The leading edge according to claim 9, wherein the support structure of the outboard leading edge section comprises only one spar diagonally arranged with the same inclination direction as the front and intermediate spars.

15. The leading edge according to claim 2, wherein the skin panel and the support structure of the edge sections, are constructed as monolithic structures, and they are made of a composite material.

16. The leading edge according to claim 9, wherein the skin panel and the support structure of the edge sections, are constructed as monolithic structures, and they are made of a composite material.

17. The leading edge according to claim 2, wherein the support structure of each section consists of at least one spar.

18. The leading edge according to claim 9, wherein the support structure of each section consists of at least one spar.

* * * * *